(12) United States Patent
Watanabe et al.

(10) Patent No.: US 12,152,672 B2
(45) Date of Patent: Nov. 26, 2024

(54) GASKET

(71) Applicant: NOK CORPORATION, Tokyo (JP)

(72) Inventors: Isao Watanabe, Fukushima (JP); Ryota Shimura, Fukushima (JP); Daiki Takekawa, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 56 days.

(21) Appl. No.: 17/799,033

(22) PCT Filed: Feb. 3, 2021

(86) PCT No.: PCT/JP2021/003919
§ 371 (c)(1),
(2) Date: Aug. 11, 2022

(87) PCT Pub. No.: WO2021/161871
PCT Pub. Date: Aug. 19, 2021

(65) Prior Publication Data
US 2023/0072950 A1    Mar. 9, 2023

(30) Foreign Application Priority Data

Feb. 12, 2020   (JP) ................................. 2020-021830

(51) Int. Cl.
*F16J 15/10*        (2006.01)
(52) U.S. Cl.
CPC .................................. *F16J 15/104* (2013.01)
(58) Field of Classification Search
CPC ....... F16J 15/0825; F16J 15/104; F16J 15/102
See application file for complete search history.

(56) References Cited

U.S. PATENT DOCUMENTS

| 5,277,434 A * | 1/1994 | Kestly ................. F16J 15/0825 |
| | | 277/592 |
| 6,399,204 B1 * | 6/2002 | Shekleton .............. F16J 15/104 |
| | | 277/944 |

(Continued)

FOREIGN PATENT DOCUMENTS

| CN | 107709449 A * | 2/2018 | ............... C08K 5/20 |
| JP | 11207859 A * | 8/1999 | |

(Continued)

OTHER PUBLICATIONS

International Search Report issued in International Patent Application No. PCT/JP2021/003919, dated Mar. 16, 2021, along with an English translation thereof.

(Continued)

*Primary Examiner* — Eugene G Byrd
(74) *Attorney, Agent, or Firm* — GREENBLUM & BERNSTEIN, P.L.C.

(57) ABSTRACT

A gasket includes an elastic part containing a rubber having a dynamic-to-static ratio, Kd/Kst, of 2.5 or lower, wherein the dynamic-to-static ratio, Kd/Kst, is a ratio between a dynamic spring constant, Kd, and a static spring constant, Kst. The dynamic spring constant, Kd, represents a constant as measured under conditions of 23±2° C., 100 Hz, and a strain amplitude of 0.1% according to JIS K6394:2007, and the static spring constant, Kst, represents a constant as measured under conditions of 23±2° C. and a strain amplitude of 0.1% according to JIS K6394:2007.

6 Claims, 1 Drawing Sheet

(56) References Cited

U.S. PATENT DOCUMENTS

| | | | |
|---|---|---|---|
| 2006/0093780 A1* | 5/2006 | Hamada | F16J 15/102 |
| | | | 428/524 |
| 2006/0155074 A1* | 7/2006 | Kudo | C08L 57/04 |
| | | | 123/90.38 |
| 2007/0228668 A1* | 10/2007 | Dempsey | F16J 15/104 |
| | | | 277/627 |
| 2008/0280040 A1* | 11/2008 | Barrall | F16J 15/125 |
| | | | 427/256 |
| 2008/0284112 A1* | 11/2008 | Koch | F16J 15/104 |
| | | | 277/590 |
| 2009/0143538 A1 | 6/2009 | Nomura et al. | |
| 2009/0322040 A1* | 12/2009 | Banba | C09J 7/22 |
| | | | 277/654 |
| 2012/0153579 A1 | 6/2012 | Nakaoka et al. | |
| 2012/0225299 A1* | 9/2012 | Takahashi | F16J 15/121 |
| | | | 427/370 |
| 2015/0028547 A1 | 1/2015 | Haglund et al. | |
| 2016/0281852 A1* | 9/2016 | Forry | F16J 15/104 |
| 2017/0343000 A1* | 11/2017 | Aihara | F04D 29/086 |
| 2018/0023705 A1* | 1/2018 | Watanabe | F16J 15/064 |
| | | | 277/647 |
| 2020/0003308 A1* | 1/2020 | Wada | F16J 15/0818 |
| 2021/0148428 A1* | 5/2021 | Watanabe | F16F 1/377 |

FOREIGN PATENT DOCUMENTS

| | | |
|---|---|---|
| JP | 2005-126473 A | 5/2005 |
| JP | 2006-52105 A | 2/2006 |
| JP | 2012-255515 A | 12/2012 |
| JP | 2013-167206 | 8/2013 |
| JP | 2019-48959 A | 3/2019 |
| WO | 2011/024812 A1 | 3/2011 |

OTHER PUBLICATIONS

International Preliminary Report on Patentability issued in International Patent Application No. PCT/JP2021/003919, dated Aug. 11, 2022, along with an English translation thereof.

Written Opinion of the International Search Authority issued in International Patent Application No. PCT/JP2021/003919, dated Mar. 16, 2022, along with an English translation thereof.

Japan Office Action issued in JP Application No. 2022-500347, dated Jul. 11, 2023.

Japan Office Action received in JP Application No. 2022-500347, dated Dec. 20, 2023.

Extended European Search Report issued in EP Application No. 21754647.2, dated Jan. 25, 2024.

JP Office Action received in JP application No. 2022-500347, dated Apr. 16, 2024.

* cited by examiner

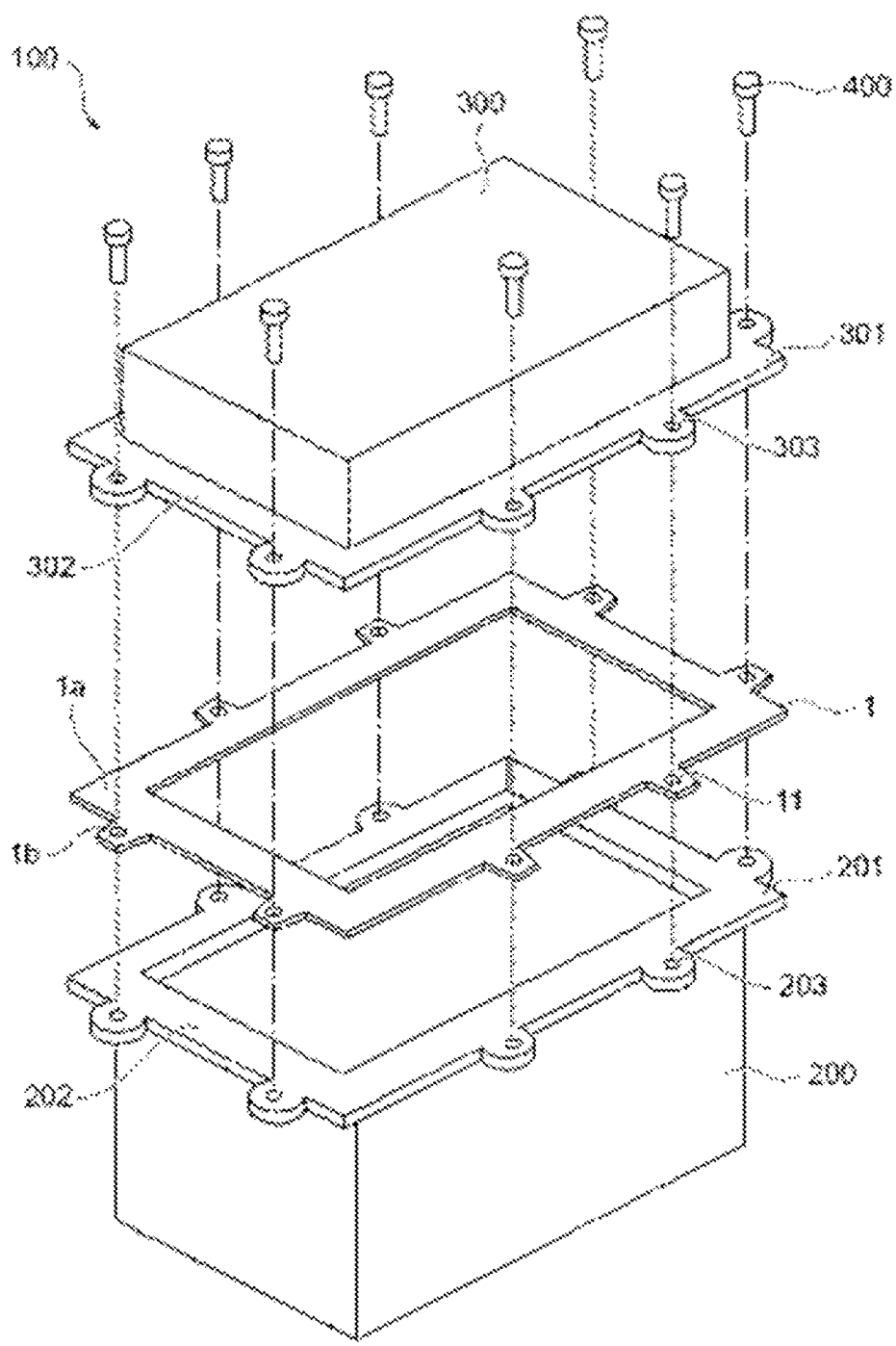

GASKET

CROSS REFERENCE TO RELATED APPLICATIONS

The present application is a national stage application of International Patent Application No. PCT/JP2021/003919 filed on Feb. 3, 2021, which claims the benefit of Japanese Patent Application No. 2020-021830, filed on Feb. 12, 2020. The contents of these applications are incorporated herein by reference in their entirety.

TECHNICAL FIELD

The present disclosure relates to a gasket.

BACKGROUND ART

Gaskets formed by laminating a rubber and a metal are currently used in various fields such as automobiles. Gaskets are required to have high sealability, and examinations to improve the compression set resistance (CS), stress relaxation properties, and rubber hardness have been performed therefor. International Publication No. WO 2011/024812 discloses a metal gasket formed by laminating a plurality of sheets of a metal sheet and a sealing material consisting of an elastic body (claim 1, paragraph [0044]).

Hybridization and electrification of automobiles are progressing and environmentally friendly automobiles such as fuel cell vehicles are under development in recent years. Gaskets for motors, gaskets for batteries such as secondary batteries and fuel cells, and gaskets for power control units are used for those automobiles. Motors are used for environmentally friendly automobiles such as hybrid automobiles, electric automobiles, and fuel cell vehicles, and thus vibration is generated when a motor is driven. Hence, damping of vibration to be generated in those environmentally friendly automobiles has been demanded. In addition, damping of vibration derived from vibration sources such as motors has been demanded for devices other than environmentally friendly automobiles, similarly.

SUMMARY OF DISCLOSURE

Technical Problem

The gasket in International Publication No. WO 2011/024812 has high sealability, whereas further improvement of the vibration-damping and/or anti-vibration effect(s) has been demanded. The present disclosure was made in view of the circumstances, and provides a gasket having superior vibration-damping characteristics and/or anti-vibration characteristics.

Solution to Problem

Embodiments of the present disclosure are as follows.
[1] A gasket including an elastic part containing a rubber having a dynamic-to-static ratio, Kd/Kst, of 2.5 or lower, wherein the dynamic-to-static ratio, Kd/Kst, is a ratio between a dynamic spring constant, Kd, and a static spring constant, Kst, wherein
the dynamic spring constant, Kd, represents a constant as measured under conditions of 23±2° C., 100 Hz, and a strain amplitude of 0.1% according to JIS K6394:2007, and
the static spring constant, Kst, represents a constant as measured under conditions of 23±2° C. and a strain amplitude of 0.1% according to JIS K6394:2007.
[2] The gasket according to [1], wherein a hardness of the rubber is 90 or lower.
[3] The gasket according to [1], including:
a metal sheet; and
the elastic part on one surface or both surfaces of the metal sheet.
[4] The gasket according to [1], wherein the rubber is nitrile rubber.
[5] The gasket according to [1], wherein the gasket is a gasket for a motor.
[6] The gasket according to any one of [1], wherein the gasket is a gasket for an inverter case.

Effects of Disclosure

The present disclosure can provide a gasket having superior vibration-damping characteristics and anti-vibration characteristics.

BRIEF DESCRIPTION OF DRAWING

FIG. 1 is an exploded perspective view of a housing to which an example of a gasket according to an embodiment of the present disclosure has been applied.

DESCRIPTION OF EMBODIMENTS

The gasket of the present disclosure includes an elastic part containing a rubber having a dynamic-to-static ratio, Kd/Kst, of 2.5 or lower, wherein the dynamic-to-static ratio, Kd/Kst, is a ratio between a dynamic spring constant, Kd, and a static spring constant, Kst. Here, the dynamic spring constant, Kd, represents a constant as measured under conditions of 23±2° C., 100 Hz, and a strain amplitude of 0.1% according to JIS K6394:2007. The static spring constant, Kst, represents a constant as measured under conditions of 23±2° C. and a strain amplitude of 0.1% according to JIS K6394:2007. The dynamic-to-static ratio, Kd/Kst, of the rubber being 2.5 or lower permits less transmission of vibration from vibration sources to the gasket. Even when vibration is transmitted from a vibration source into the elastic part, the vibration is readily converted into thermal energy in the elastic part. As a result, the gasket is allowed to have superior vibration-damping and/or anti-vibration properties, and the gasket is capable of effectively preventing transmission of vibration from a vibration source to other members. Since the gasket damps vibration from vibration sources, the gasket can reduce noises derived from the vibration, improving the low-noise characteristics of devices including the gasket. The elastic part typically consists of a rubber having a dynamic-to-static ratio, Kd/Kst, of 2.5 or lower. For example, the gasket can be used for motors, or for inverter cases, and can reduce vibration and noises to be generated from these devices. The gasket can be used in the inside of any machine or device including a motor or an inverter case, such as an automobile, a robot, and a home appliance. If the gasket of the present disclosure is used in an automobile, the automobile can be comfortably driven because vibration and noises are reduced.

The dynamic spring constant, Kd, and static spring constant, Kst, of the rubber forming the elastic part are measured as follows. The cure rate of a rubber composition for the elastic part is measured in advance to determine $T_c(90)$ (90% cure time) in accordance with JIS K6300-2. Subsequently, compression and vulcanization of the rubber composition for the elastic part are performed under conditions over $T_c(90)$ to prepare a rubber piece. Thereafter, the dynamic spring constant is measured by using a tensile method under conditions of 23±2° C., 100 Hz, and a strain amplitude of 0.1% in accordance with a non-resonance forced vibration method described in JIS K6394:2007. The static spring constant is measured by using a tensile method under conditions of 23±2° C. and a strain amplitude of 0.1% according to JIS K6394:2007. The dynamic-to-static ratio, Kd/Kst, can be determined by dividing the thus-determined dynamic spring constant, Kd, of the rubber by the static spring constant, Kst, of the rubber. For the apparatus to measure the dynamic spring constant and the static spring constant, for example, a Rheogel-E4000 manufactured by USM can be used. The dynamic-to-static ratio, Kd/Kst, is 2.5 or lower, it is preferable that the dynamic-to-static ratio, Kd/Kst, be 2.0 or lower, and it is more preferable that the dynamic-to-static ratio, Kd/Kst, be 1.8 or lower. It is preferable that the dynamic-to-static ratio, Kd/Kst, be 0.5 or higher, and it is more preferable that the dynamic-to-static ratio, Kd/Kst, be 1.0 or higher. The value of the dynamic-to-static ratio being within the range allows the gasket to have higher vibration-damping characteristics and/or anti-vibration characteristics. It is preferable that the dynamic spring constant be 1.5 g/μm or lower, it is more preferable that the dynamic spring constant be 1.2 g/μm or lower, and it is further preferable that the dynamic spring constant be 0.8 g/μm or lower. The value of the dynamic spring constant being within the range allows the gasket to achieve superior vibration-damping characteristics and/or anti-vibration characteristics and sealability in combination.

It is preferable that the hardness (durometer A hardness) of the rubber contained in the elastic part be 90 or lower, it is more preferable that the hardness (durometer A hardness) of the rubber contained in the elastic part be 85 or lower, and it is further preferable that the hardness (durometer A hardness) of the rubber contained in the elastic part be 80 or lower. The hardness of the rubber being within the range allows the gasket to have higher sealing performance and vibration-damping and/or anti-vibration characteristics. The hardness of the rubber can be measured with a method in accordance with JIS K6253.

The gasket according to an embodiment includes a metal sheet and an elastic part containing a rubber having a dynamic-to-static ratio, Kd/Kst, of 2.5 or lower on one surface or both surfaces of the metal sheet. The material of the metal sheet is not particularly limited, and iron, aluminum, copper, or the like, or art alloy or the like of them is used therefor; for example, an SPCC (Steel Plate Cold Commercial), an SPFC (Steel Plate Formability Cold), a mild steel sheet, a stainless-steel sheet, an aluminum sheet, or an aluminum die-cast sheet can be used. For the stainless-steel sheet, for example, SUS301, SUS301H, SUS304, or SUS430 can be used. The thickness of the metal sheet is not particularly limited, and it is preferable that the thickness of the metal sheet be 100 to 2000 μm, and it is more preferable that the thickness of the metal sheet be 200 to 1000 μm. The metal sheet can be used after being degreased, and the metal surface can be roughened, for example, with shot blasting, a Scotch-Brite, hairlines, or dull finish, as necessary. The elastic part may be adhered to the metal sheet by inclusion of an adhesive component in the elastic part, or by providing an adhesive layer between the elastic part and the metal sheet. The adhesive component and the component of the adhesive layer are not particularly limited as long as the adhesive component and the component of the adhesive layer can improve the adhesion between the metal sheet and the elastic part, and, for example, a resin vulcanization adhesive such as phenolic resin and epoxy resin can be used. Examples of the phenolic resin include any thermosetting phenolic resin such as cresol-novolac-type phenolic resin, cresol-resol-type phenolic resin, and alkyl-modified phenolic resin. Examples of the epoxy resin include cresol-novolac-type epoxy resin; in this case, bisphenol-novolac-type phenolic resin and an imidazole compound are used as a curing agent and a curing catalyst, respectively.

It is preferable that the rubber forming the elastic part be nitrile rubber (NBR). The nitrile rubber is a copolymer of butadiene and acrylonitrile. The nitrile rubber (NBR) may be hydrogenated or not. For the nitrile rubber, various types of NBR can be used, such as NBR with ultrahigh nitrile contents (nitrile content: 43% or more), NBR with high nitrile contents (nitrile content: 36 to 42%), NBR with middle-high nitrile contents (nitrile content: 31 to 35%), NBR with middle nitrile contents (nitrile content: 25 to 30%), and NBR with low nitrile contents (nitrile content: 24% or less).

The rubber can further contain carbon black, silica, a filler, a plasticizer, an additive, an antidegradant, a vulcanizing agent, a vulcanization accelerator, a vulcanization aid, and others. An appropriate type of carbon black can be selected according to the application of the gasket; for example, SAF carbon black, ISAF carbon black, HAF carbon black, EPC carbon black, XCF carbon black, FEF carbon black, GPF carbon black, HMF carbon black, SR carbon black, FT carbon black, and MT carbon black can be used. Examples of the additive include calcium metasilicate, calcium carbonate, zinc oxide, stearic acid, and waxes. The vulcanizing agent is not particularly limited as long as the vulcanizing agent is applicable as a vulcanizing agent for rubber, and examples thereof include a sulfur vulcanizing agent and an organic peroxide vulcanizing agent.

Examples of the sulfur vulcanizing agent include sulfur such as powders of sulfur, flowers of sulfur, precipitated sulfur, colloidal sulfur, highly dispersed sulfur, and insoluble sulfur; and sulfur-containing compounds such as sulfur chloride, sulfur dichloride, morpholine disulfide, alkylphenol disulfide, dibenzothiazyl disulfide, N,N'-dithio-bis(hexahydro-2H-azepin-2-one), phosphorus-containing polysulfides, and polymeric polysulfides. Examples of the organic peroxide vulcanizing agent include ketone peroxides, peroxyesters, diacyl peroxides, and dialkyl peroxides. As necessary, a vulcanization accelerator or a vulcanization aid can be used.

FIG. 1 shows an exploded perspective view of a housing to which an example of the gasket according to an embodiment has been applied. The housing 100 shown in FIG. 1 is formed of two members: a case member 200 and a lid member 300. The case member 200 and the lid member 300 respectively include flange parts 201 and 301 in an integrated manner, each surrounding the corresponding opening. One gasket 1 is disposed between butting surfaces 202 and 302 of the flange parts 201 and 301, the butting surfaces facing to each other. The butting surfaces 202 and 302 of the flange parts 201 and 301 are formed to surround the outer periphery of the openings of the case member 200 and the lid member 300, respectively, each with a band-like area having a constant width. Sites at which bolt holes 203 and 303 are to be formed are partially protruding outward to the side direction.

The gasket 1 includes an annular part 1a and protruding parts 1b. The annular part 1a is formed to have the same constant width as the butting surfaces 202 and 302 of the flange parts 201 and 301 in the case member 200 and the lid member 300. The protruding parts 1b are partially protruding outward from the annular part 1a to the side direction at the positions corresponding to the bolt holes 203 and 303 of the flange parts 201 and 301, in such a manner that the protruding parts 1b and the annular part 1a are continuous like forming a smooth curve. In each protruding part 1b, bolt holes 11 to be fit to the corresponding bolt holes 203 and 303 of the flange parts 201 and 301 are formed.

In the housing 100, bolts 400 are inserted through the bolt holes 203, 303, and 11 at each position, thereby tightening up to integrate the three: the case member 200, the lid member 300, and the gasket 1. The space between the butting surfaces 202 and 302 of the flange parts 201 and 301 is sealed with the gasket 1 arranged between the flange parts 201 and 301 with close attachment.

The gasket 1 is not particularly limited as long as the gasket 1 has the configuration described above. In the above description, an example has been shown in which the gasket 1 according to an embodiment is applied as a sealing member between the flange parts 201 and 301 of the case member 200 and the lid member 300 in the housing 100. However, the gasket 1 according to an embodiment is not limited to application to such a housing 100, and widely applicable for sealing butting surfaces of two members.

It is preferable that the gasket be a gasket for a motor.

It is also preferable that the gasket be a gasket for an inverter case.

In a method for producing the gasket according to an embodiment, for example, a solution containing a rubber composition for the elastic part is applied dropwise onto a base material such as a metal sheet, and the solution is then dried by heating with simultaneous vulcanization of the rubber composition to form the elastic part. The solution containing a rubber composition for the elastic part is not particularly limited, and, for example, methyl ethyl ketone, toluene, or ethyl acetate can be used.

EXAMPLES

Hereinafter, preferred embodiments of the present disclosure will be specifically described on the basis of Examples and Comparative Examples; however, the present disclosure is not limited to these Examples.

Examples 1 to 14 and Comparative Examples 1 to 5

Rubber compositions were prepared by mixing materials according to formulations shown later in Table 1 with a pressure kneader (manufactured by Nihon Spindle Manufacturing Co., Ltd.) and an open roll (manufactured by KANSAI ROLL Co., Ltd.).

Evaluation

The rubber compositions thus obtained were subjected to the following measurements.

(a) Measurement of Hardness, Tensile Strength, and Elongation of Elastic Part The cure rate of a rubber composition was measured in advance to determine $T_c(90)$ (90% cure time) in accordance with JIS K6300-2. Subsequently, compression and vulcanization of the rubber composition were performed under conditions over $T_c(90)$ to prepare a test piece. The test piece was subjected to measurement of hardness (durometer A hardness) in accordance with JIS K6253, and measurement of tensile strength and elongation in accordance with JIS K6251.

(b) Measurement of Dynamic Spring Constant Kd

Compression and vulcanization of a rubber composition were performed under the same conditions as in (a) to prepare a test piece having a thickness of 2 mm, a width of 4 mm, and a length of 20 mm. Subsequently, the dynamic spring constant of the test piece was measured with a tensile method using a Rheogel-E4000 manufactured by UBM under conditions of 23±2° C., 100 Hz, and a strain amplitude of 0.1% in accordance with the non-resonance forced vibration method described in JIS K6394:2007.

(c) Measurement of Static Spring Constant, Kst

Compression and vulcanization of a rubber composition were performed under the same conditions as in (a) to prepare a test piece having a thickness of 2 mm, a width of 4 mm, and a length of 20 mm. Subsequently, the static spring constant of the test piece was measured with a tensile method using a Rheogel-E4000 manufactured by UBM under conditions of 23±2° C. and a strain amplitude of 0.1% in accordance with JIS K6394:2007.

(d) Calculation of Dynamic-to-Static Ratio, Kd/Kst

The dynamic-to-static ratio, Kd/Kst, was calculated by using the following expression with the dynamic spring constant, Kd, and the static spring constant, Kst, determined in (b) and (c).

Dynamic-to-static ratio, Kd/Kst=(dynamic spring constant, Kd)/(static spring constant, Kst)

(e) Measurement of Loss Factor of Gasket

The surface of an SPCC steel sheet of 400 μm in thickness was treated with zinc phosphate. After that, methyl ethyl ketone (MEK) dissolving phenolic resin (Thixon 715 (product name)) therein was applied onto the SPCC steel sheet, and dried. Subsequently, each of the rubber compositions produced in the examples were dissolved in methyl ethyl ketone (MEK). After that, the MEK dissolving the rubber composition therein was applied onto the SPCC steel sheet after being coated with the MEK solution containing phenolic resin, and the rubber composition was then vulcanized in an oven at 200° C. for 3 minutes to form an elastic part of 120 μm in thickness on the SPCC steel sheet (metal sheet). Thus, a gasket having a width of 17 mm and a length of 250 mm and including an elastic part on an SPCC steel sheet (metal sheet) was obtained. The thus-obtained gasket was laminated on an SUS301 sheet having a thickness of 250 μm, a width of 17 mm, and a length of 250 mm via a cyanoacrylate adhesive to give a sample for loss factor measurement. Preliminary experiment performed in advance had confirmed that adhesives of any type that allow the gasket to be laminated on the SUS301 sheet are applicable without affecting the loss factor values.

Subsequently, the loss factor was measured with a half-width method using an AS14PA5 (cantilever type) manufactured by RION Co., Ltd. in accordance with JIS K7391:2008 at a measurement temperature of 23±2° C. on the basis of secondary resonance frequency in the measurement range of 0 to 1 kHz. If the loss factor was 0.03 or higher, the vibration-damping and/or anti-vibration properties were determined to be good and rated as "good", and if the loss factor was lower than 0.03, the vibration-damping and/or anti-vibration properties were determined to be poor and rated as "poor". Table 1 in the following shows the compositions and evaluation results of vibration-damping and/or anti-vibration properties for the rubber compositions.

TABLE 1

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Composition of elastic part (part by mass) | Nitrile rubber A | 100 | 100 | 100 | 100 | 100 | 100 | 100 | 100 | 100 | 100 | 100 |
| | Nitrile rubber B | | | | | | | | | | | |
| | Nitrile rubber C | | | | | | | | | | | |
| | Carbon black A | 45 | 90 | 151 | | | | | | | | 65 |
| | Carbon black B | | | | 31 | 65 | 104 | 110 | | | | |
| | Carbon black C | | | | | | | | 30 | 56 | 90 | |
| | Carbon black D | | | | | | | | | | | |
| | Carbon black E | | | | | | | | | | | |
| | Silica | | | | | | | | | | | |
| | Filler A | | | | | | | | | | | |
| | Filler B | | | | | | | | | | | |
| | Filler C | | | | | | | | | | | |
| | Plasticizer | | | | | | | | | | | 10 |
| | Additive A | 5 | 5 | 5 | 5 | 5 | 5 | 5 | 5 | 5 | 5 | 5 |
| | Additive B | 1 | 1 | 1 | 1 | 1 | 1 | 1 | 1 | 1 | 1 | 1 |
| | Additive C | 2 | 2 | 2 | 2 | 2 | 2 | 2 | 2 | 2 | 2 | 2 |
| | Additive D | 2 | 2 | 2 | 2 | 2 | 2 | 2 | 2 | 2 | 2 | 2 |
| | Vulcanizing agent A | 1.5 | 1.5 | 1.5 | 1.5 | 1.5 | 1.5 | 1.5 | 1.5 | 1.5 | 1.5 | 1.5 |
| | Vulcanizing agent B | 1 | 1 | 1 | 1 | 1 | 1 | 1 | 1 | 1 | 1 | 1 |
| | Vulcanizing agent C | | | | | | | | | | | |
| | Vulcanization accelerator A | 5 | 5 | 5 | 5 | 5 | 5 | 5 | 5 | 5 | 5 | 5 |
| | Vulcanization accelerator B | 4 | 4 | 4 | 4 | 4 | 4 | 4 | 4 | 4 | 4 | 4 |
| | Vulcanization aid | | | | | | | | | | | |
| Properties of elastic part | Hardness (durometer A hardness) | 65 | 75 | 85 | 65 | 76 | 86 | 87 | 67 | 77 | 85 | 65 |
| | Tensile strength (MPa) | 9.69 | 13.9 | 14.6 | 11.6 | 19.1 | 22.6 | 22.4 | 13.4 | 18.8 | 23.7 | 9.05 |
| | Elongation (%) | 240 | 240 | 170 | 250 | 230 | 150 | 140 | 260 | 250 | 170 | 280 |
| | Dynamic spring constant, Kd (g/μm) | 0.247 | 0.471 | 1.11 | 0.258 | 0.495 | 1.3 | 1.437 | 0.28 | 0.526 | 1 | 0.208 |
| | Static spring constant, Kst (g/μm) | 0.149 | 0.259 | 0.495 | 0.156 | 0.267 | 0.543 | 0.584 | 0.168 | 0.285 | 0.484 | 0.148 |
| | Dynamic-to-static ratio, Kd/Kst (—) | 1.658 | 1.819 | 2.242 | 1.654 | 1.854 | 2.394 | 2.461 | 1.667 | 1.846 | 2.066 | 1.405 |
| Properties of gasket | Loss factor (—) | 0.108 | 0.09 | 0.044 | 0.113 | 0.067 | 0.038 | 0.034 | 0.083 | 0.073 | 0.051 | 0.071 |
| | Rating of vibration-damping and/or anti-vibration properties | good | good | good | good | good | good | good | good | good | good | good |

| | | Example 12 | Example 13 | Example 14 | Comparative Example 1 | Comparative Example 2 | Comparative Example 3 | Comparative Example 4 | Comparative Example 5 |
|---|---|---|---|---|---|---|---|---|---|
| Composition of elastic part (part by mass) | Nitrile rubber A | 100 | 100 | 100 | | | | | 100 |
| | Nitrile rubber B | | | | 100 | 100 | | 100 | |
| | Nitrile rubber C | | | | | | 100 | | |
| | Carbon black A | 115 | 181 | 100 | | 125 | | | |
| | Carbon black B | | | | 60 | 20 | | 80 | 125 |
| | Carbon black C | | | | | | | | |
| | Carbon black D | | | | | | 20 | | |
| | Carbon black E | | | | | | 45 | | |
| | Silica | | | | 40 | | | | |
| | Filler A | | | 30 | | 30 | | | |
| | Filler B | | | | | | | 40 | |
| | Filler C | | | | | | | 40 | |
| | Plasticizer | 10 | 10 | | | | | | |
| | Additive A | 5 | 5 | 5 | 5 | 5 | 5 | 5 | 5 |
| | Additive B | 1 | 1 | 1 | 1 | 1 | 1 | 1 | 1 |
| | Additive C | 2 | 2 | 2 | 2 | 2 | 2 | 2 | 2 |

TABLE 1-continued

|  |  | | | | | | | | |
|---|---|---|---|---|---|---|---|---|---|
| | Additive D | 2 | 2 | 2 | 2 | 2 | 2 | 2 | 2 |
| | Vulcanizing agent A | 1.5 | 1.5 | | | 1.5 | 1.5 | | 1.5 |
| | Vulcanizing agent B | 1 | 1 | | | 1 | 1 | | 1 |
| | Vulcanizing agent C | | | 6 | 16 | | | 6 | |
| | Vulcanization accelerator A | 5 | 5 | | | 5 | 5 | | 5 |
| | Vulcanization accelerator B | 4 | 4 | | | 4 | 4 | | 4 |
| | Vulcanization aid | | | 2 | 2 | | | 2 | |
| Properties of elastic part | Hardness (durometer A hardness) | 74 | 84 | 87 | 94 | 91 | 86 | 90 | 91 |
| | Tensile strength (MPa) | 11.5 | 12.2 | 18.3 | 23.5 | 15.5 | 26.5 | 16.4 | 22.3 |
| | Elongation (%) | 250 | 140 | 130 | 60 | 120 | 250 | 220 | 110 |
| | Dynamic spring constant, Kd (g/μm) | 0.407 | 0.932 | 1.02 | 8.33 | 2.17 | 1.94 | 3.42 | 2.001 |
| | Static spring constant, Kst (g/μm) | 0.252 | 0.449 | 0.481 | 1.91 | 0.837 | 0.522 | 0.946 | 0.761 |
| | Dynamic-to-static ratio, Kd/Kst (—) | 1.615 | 2.076 | 2.121 | 4.361 | 2.593 | 3.716 | 3.615 | 2.629 |
| Properties of gasket | Loss factor (—) | 0.059 | 0.038 | 0.03 | 0.005 | 0.017 | 0.027 | 0.006 | 0.028 |
| | Rating of vibration-damping and/or anti-vibration properties | good | good | good | poor | poor | poor | poor | poor |

The names of the materials in Table 1 are shown in the following.
Nitrile rubber A: Nipol (R) DN3350 (Zeon Corporation)
Nitrile rubber B: JSR N237 (JSR Corporation)
Nitrile rubber C: JSR N220S (JSR Corporation)
Carbon black A (MT carbon black): THERMAX (R) N990 LSR (Cancarb Limited)
Carbon black B (SRF carbon black): HTC #SS (NSCC Carbon Co., Ltd.)
Carbon black C (SRF carbon black): ASAHI #50HG (Asahi Carbon Co., Ltd.)
Carbon black D (FEF carbon black): SEAST (R) SO (TOKAI CARBON CO., LTD.)
Carbon black E (HAF carbon black): Show Black (R) N330L (Cabot Japan K. K.)
Silica: Nipsil (R) LP (Tosoh Corporation)
Filler A: AKTISIL VM56 (HOFFMANN MINERAL GmbH)
Filler B: Nyad (R) 400 (NYCO Minerals, Inc.)
Filler C: HAKUENKA (R) CC (Shiraishi Kogyo Kaisha, Ltd.)
Plasticizer: ADEKACIZER (R) RS107 (ADEKA Corporation)
Additive A: zinc oxide (Seido Chemical Industry Co., Ltd.)
Additive B: DTST (MIYOSHI OIL & FAT CO., LTD.)
Additive C: NOCRAC 810-NA (OUCHI SHINKO CHEMICAL INDUSTRIAL CO., LTD)
Additive D: SUNTIGHT (R) R (Seiko Chemical Co., Ltd.)
Vulcanizing agent A: Colloidal Sulfur A (Tsurumi Chemical Industry Co., ltd.) vulcanizing agent B: VULNOC (R) R (OUCHI SHINKO CHEMICAL INDUSTRIAL CO., LTD)
Vulcanizing agent C: PEROXYMON (R) F-40 (NOF CORPORATION)
Vulcanization accelerator A: NOCCELER (R) TBZTD (OUCHI SHINKO CHEMICAL INDUSTRIAL CO., LTD)
Vulcanization accelerator B: NOCCELER (R)-CZ-P (OUCHI SHINKO CHEMICAL INDUSTRIAL CO., LTD)
Vulcanization aid: TAIC (R) M60S (Mitsubishi Chemical Corporation)

It can be understood from the results in Table 1 that a loss factor of 0.03 or higher was achieved when the dynamic-to-static ratio, Kd/Kst, of a rubber forming the elastic part was 2.5 or lower, thus giving a gasket superior in vibration-damping and/or anti-vibration properties.

The invention claimed is:

1. A gasket comprising an elastic part containing a nitrile rubber having a dynamic-to-static ratio, $K_d/K_{st}$, of 1.8 or lower, wherein the dynamic-to-static ratio, $K_d/K_{st}$, is a ratio between a dynamic spring constant, $K_d$, and a static spring constant, $K_{st}$, wherein
   the dynamic spring constant, $K_d$, represents a constant as measured under conditions of 23±2° C., 100 Hz, and a strain amplitude of 0.1% according to JIS K6394: 2007, and
   the static spring constant, $K_{st}$, represents a constant as measured under conditions of 23±2° C. and a strain amplitude of 0.1% according to JIS K6394:2007.

2. The gasket according to claim 1, wherein a durometer A hardness of the rubber is 90 or lower.

3. The gasket according to claim 1, comprising:
   a metal sheet; and
   the elastic part on one surface or both surfaces of the metal sheet.

4. The gasket according to claim 1, wherein the gasket is a gasket for a motor.

5. The gasket according claim 1, wherein the gasket is a gasket for an inverter case.

6. The gasket according to claim 1, wherein the dynamic spring constant is 1.5 g/μm or lower.

* * * * *